E. S. EVANS.
DOUBLE DECKING BUCK.
APPLICATION FILED MAR. 24, 1920.
1,388,247.
Patented Aug. 23, 1921.
Fig. 1.
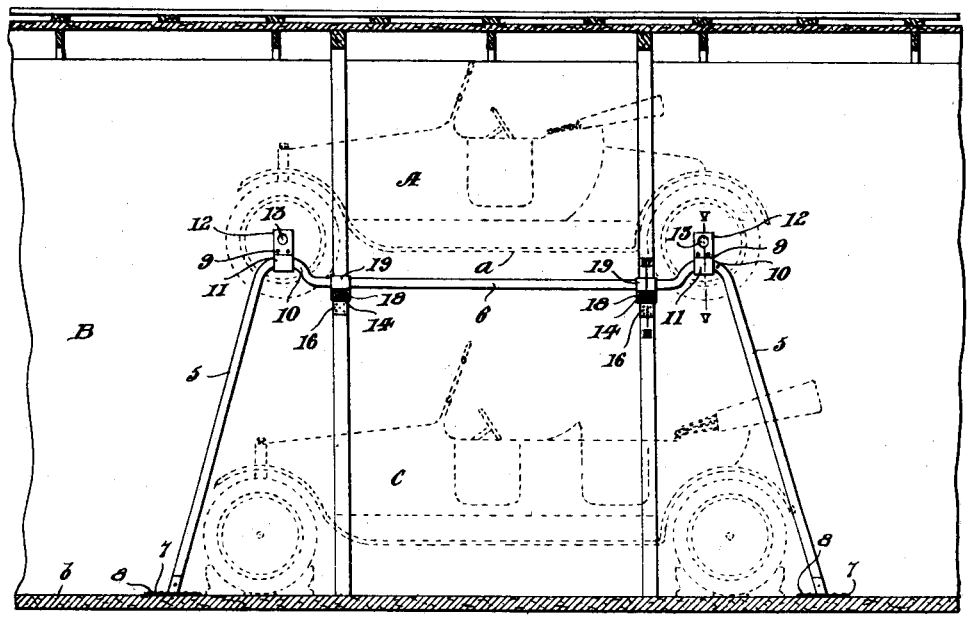
Fig. 2.
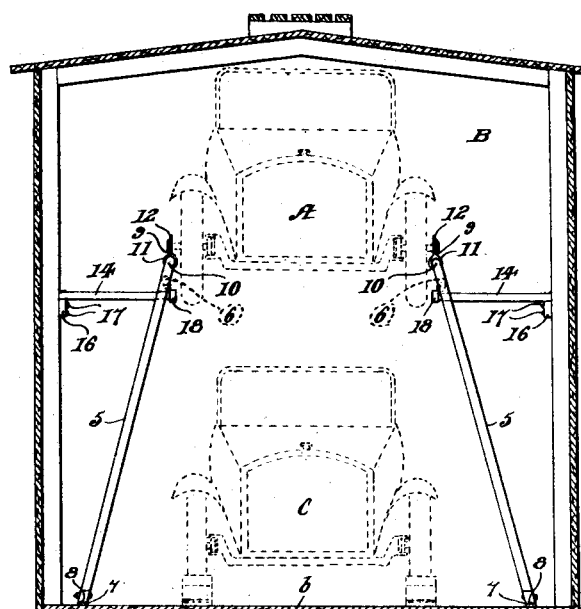
Fig. 3.
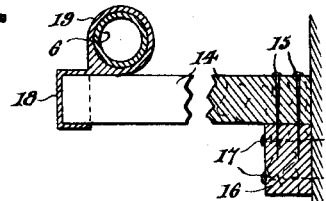
Fig. 4.
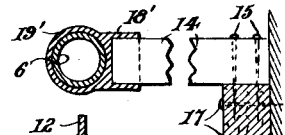
Fig. 5.
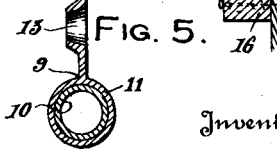
Fig. 6.
Fig. 7.
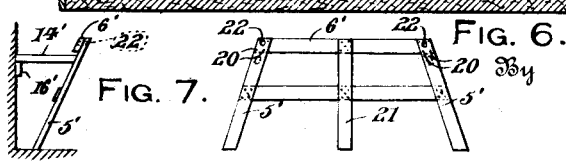
Inventor
Edward S. Evans
By
J. K. Bryant
Attorney

UNITED STATES PATENT OFFICE.

EDWARD S. EVANS, OF DETROIT, MICHIGAN.

DOUBLE-DECKING BUCK.

1,388,247.  Specification of Letters Patent.  Patented Aug. 23, 1921.

Application filed March 24, 1920. Serial No. 368,367.

*To all whom it may concern:*

Be it known that I, EDWARD S. EVANS, a citizen of the United States of America, residing at Detroit, in the county of Wayne and State of Michigan, have invented certain new and useful Improvements in Double-Decking Bucks, of which the following is a specification.

This invention relates to certain new and useful improvements in automobile double decking bucks particularly adapted for supporting an automobile in a freight car sufficiently clear of the floor of the latter to provide clearance for a second automobile in the freight car beneath the first automobile.

Heretofore, in loading automobiles in freight cars under the double decking system, considerable expense and labor in construction was involved in supporting the upper automobile because of the use of individual bucks for supporting each corner of the automobile, thus necessitating two bucks at each side of the car or four bucks in all. Obviously, this entailed the handling of a large number of bucks in shipping a quantity of automobiles and required considerable time in placing the automobiles in the freight cars for shipment.

The primary object of the present invention is to provide a double decking buck for automobiles which is of simpler construction than any previously invented and yet capable of and adapted for completely supporting one side of an automobile so that only two bucks are necessary for supporting each automobile in the required elevated position, thus facilitating the positioning of the automobiles for shipment and enabling the same to be done at a greatly reduced expense.

Other forms of bucks now employed utilize the automobile frame as the spanning member or connector between the hub or axle supports, whereby traveling strains and stresses are imparted to the vehicle, which is often damaged thereby. Another object of my invention is to provide a single piece buck for supporting one entire side of the automobile and taking up all such strains and stresses, incident to transportation.

I preferably carry out the objects of the present invention by the provision of a pair of bucks for supporting each automobile, each buck involving upwardly converging standards or uprights and a horizontal member which has means at its end portions adjacent the uprights or standards, for reception of the hubs of both front and rear supporting wheels at one side of the automobile, any preferred means being utilized to brace each buck in a substantially upright operative position.

The invention further resides in such features of construction and arrangements and combinations of parts as will more fully hereinafter appear.

In the drawings wherein like reference characters indicate corresponding parts throughout the several views.

Figure 1 is a longitudinal vertical sectional view of a fragment of a freight car having automobiles loaded therein under the double decking method and employing bucks constructed in accordance with the present invention, Fig. 2 is a transverse sectional view of the device shown in Fig. 1, Fig. 3 is an enlarged view, partly in section on the line III—III of Fig. 1 and partly broken away of the preferred means utilized for bracing the bucks in their operative position.

Fig. 4 is a view similar to Fig. 3, showing a modification of the buck bracing means, Fig. 5 is a transverse sectional view taken substantially upon line V—V of Fig. 1 and shown on a larger scale to clearly illustrate the hub or axle receiving member of the buck, Fig. 6 shows a modification of the buck shown in Fig. 1 which is particularly adapted to be constructed of wood, and Fig. 7 is an end view of the device shown in Fig. 6.

As shown clearly in Figs. 1 and 2, the automobile A, under the double decking system, is supported in the freight car B by suitable bucks a sufficient distance above the floor *b* of the freight car to provide clearance for a second automobile C beneath the first automobile A, the automobile C being immovably held by any suitable means such as chock blocks or other like contrivances.

The present invention, which resides in the form of buck employed for supporting the upper automobile A, preferably comprises a buck embodying a supporting element of rod or tubular metal form and including end uprights, standards or legs 5 which are connected by a horizontal member 6, preferably integral therewith and extending therebetween. The standards or legs 5 preferably converge upwardly as shown in Fig. 1 so as to effectively brace the automobile A against forward or backward movement in the freight car, and the lower ends of said legs 5 preferably have flanges 7 rigid upon their lower ends adapted to have nails 8 or other holdfast devices driven therethrough into the floor of the freight car for rigidly fastening the buck in an operative position.

The horizontal leg connecting member of each buck has a hub or axle receiving member 9 supported or mounted upon the end portions thereof adjacent each leg 5, and these end portions of the connecting member 6 are preferably bowed upwardly as at 10 so as to bring the intermediate or remaining portion of said connecting member 6 down sufficiently low to clear the running board a of the automobile A and thereby prevent said running board from interfering with the easy and quick loading of the car with automobiles. It will thus be seen that each buck is substantially in the form of an inverted U-shaped rigid member having means at or adjacent to the juncture of the legs thereof with the connecting member or base of the same, for reception of the hubs, axles, or like parts at both the front and rear portions of the automobile at one side of the latter to enable one buck to completely support each side of the automobile.

As shown clearly in Figs. 1, 2, and 5, the members 9 are each preferably in the form of a sleeve 11 snugly fitting and mounted upon an end portion 10 of the leg connecting member 6 of the buck and having an upstanding ear 12 whose aperture 13 is of such size and form as to snugly receive the automobile part desired, which part is preferably the hub of the supporting wheel or the end portion of the axle thereof.

It will, of course, be understood that two bucks are employed for supporting or suspending each upper automobile A as shown more clearly in Fig. 2, one buck being arranged at each side of the automobile. The bucks of each pair are preferably arranged in upwardly converging relation as is also shown in Fig. 2 so as to effectively brace the automobile A against lateral movement in either direction, and afford clearance for the automobile C therebeneath. The upper portion of each buck is effectively held or braced against movement away from the automobile by any suitable means so as to insure retention of the automobile parts within the apertures 13 of the ears 12. This last mentioned bracing means may, and preferably does consist of outwardly projecting pairs of bracing arms 14 whose outer ends are nailed as at 15 or otherwise fastened upon the upper surface of cleats 16 which are fastened by means of nails 17 or the like to the inner surfaces of the side walls of the freight car B. There are two bracing arms 14 for each buck, each bracing arm 14 having its inner end snugly fitting within a socket member 18 which depends from and is rigid with a sleeve 19 encircling the horizontal buck member 6. One sleeve 19 is preferably arranged, as shown in Fig. 1, adjacent each upwardly bowed end portion 10 of the leg connecting member 6, and the two sleeves 19 on each bar 6 are preferably arranged between the hub engaging members 9 thereon.

It will thus be seen that with a pair of bucks disposed in upwardly converging relation as shown in Fig. 2 and held against separation at their upper ends by means of the bracing arms 14 with the wheel hubs of the automobile disposed in the openings 13 of the ears 12, the upper automobile A is effectively suspended and rigidly held against movement upon forward, backward or sidewise strains or stresses of the freight car. It will also be seen that an automobile may be much more quickly suspended by use of a pair of bucks constructed as hereinbefore described in view of the fact that the same may be easily handled and an entire side of an automobile supported by each buck when operatively positioned. On the other hand, it will be seen that it will require little time or trouble to remove the bracing arms 14 for permitting removal of each pair of bucks when the automobiles are to be unloaded from the freight car.

In Fig. 4 a slight modification of the socket carrying sleeves for the bracing arms 14 is shown. In this figure the bracing arm 14 is secured in a similar manner to the cleat 16 but the sleeve 19' has an outwardly extending socket 18' so arranged that when the bracing arm 14 is engaged with said socket 18', the same is alined with or on the same horizontal plane as the sleeve 19' and the leg connecting member 6 of the buck.

As shown in Figs. 6 and 7, the same principle of entirely supporting each side of the automobile by means of a single buck may be carried out by forming the buck of rigidly connected wooden members instead of a single piece of metal as above described with respect to the legs 5 and connecting members 6 in Figs. 1 and 2. In Figs. 6 and 7, the buck is shown as composed of upwardly converging legs 5' formed of similar strips of wood and rigidly bolted or otherwise fastened at their upper ends as at 20 to the opposite end portions of the horizontal leg connecting board or member 6'. In order to effectively brace the leg connecting board 6' and to support the same against breakage between its ends, an additional leg 21 is rigidly fastened thereto substantially midway between the supporting legs 5'. The legs 5', and the connecting member 6' therefor, may be apertured as at 22 at the point where these members overlap and are fastened together by means of bolts 20 or the like, so as to provide for the reception of the automobile hubs or axles in a similar manner to that in which the hubs or axles are received within the openings or apertures 13 of the members 9 in the form of construction shown in Figs. 1, 2, and 5. When using the buck of Figs. 6 and 7, two of the same are employed in substantially the same manner as shown in Fig. 2 with respect to the other or preferred form of buck, the bucks being upwardly converged by inclining the same as shown by one buck in Fig. 7. Bracing arms 14' are also provided for the buck of Fig. 6, the inner ends of the arms 14' being associated with the buck so as to prevent movement of the same toward the side of the freight car, the outer ends of the arms being fastened to cleats as at 16'.

From the foregoing description it is believed that the construction and manner of use of the present invention will be readily understood and its true and meritorious advantages appreciated by those skilled in the art.

Minor changes may be made in the various parts and combinations and arrangements thereof shown and described without departing from the spirit and scope of the invention as claimed.

What is claimed as new is:

1. A double decking system for automobiles comprising an inverted substantially U-shaped member, means adjacent the juncture of the legs of said member with the leg connecting member thereof for supporting engagement with parts of an automobile at the front and rear ends of the latter and at one side of the same, said leg connecting member being downwardly offset intermediate its ends to clear the running board of the suspended automobile.

2. A buck for automobiles comprising a pair of legs, a substantially horizontal member extending between and rigidly connecting the upper ends of said legs, and a brace receiving socket mounted upon said leg connecting member.

3. A double decking buck for automobiles comprising a pair of legs, a substantially horizontal member rigidly connected between the said legs, and a brace receiving socket carried thereby.

4. A double decking buck for automobiles comprising a pair of legs, a substantially horizontal member rigidly connected between the said legs, a brace receiving socket mounted upon said horizontal member, and means adjacent the opposite ends of said horizontal member adapted for the supporting reception of the hubs of the front and rear wheels at one side of an automobile.

5. A double decking buck for automobiles of the class described comprising a pair of legs, a substantially horizontal member extending between and rigidly connecting the upper ends of said legs, brace receiving sockets mounted upon said horizontal member, and means adjacent the opposite ends of said horizontal member for the supporting reception of the hubs of the front and rear wheels at one side of an automobile, said means including ears mounted upon the horizontal member.

6. A double decking buck for automobiles of the class described comprising a pair of legs, a substantially horizontal member extending between and rigidly connecting the upper ends of said legs, brace receiving sockets mounted upon said horizontal member, and means adjacent the opposite ends of said horizontal member for the supporting reception of the hubs of the front and rear wheels at one side of an automobile, said means including sleeves encircling the end portions of said horizontal member and having receiving ears.

7. Means for suspending an automobile comprising a pair of bucks each arranged at one side of the automobile and each including a pair of supporting legs and a substantially horizontal member rigidly connected therebetween and means adjacent the ends of said horizontal members for supporting reception of the hubs of the front and rear wheels upon the same side of the suspended automobile.

8. Means for suspending an automobile in a freight car comprising a pair of bucks each arranged at one side of the automobile and each including a pair of supporting legs and a substantially horizontal member rigidly connected therebetween and means adjacent the ends of said horizontal members for supporting reception of the hubs of the front and rear wheels upon the same side of the suspended automobile, horizontal outwardly projecting bracing arms rigidly carried by the sides of the freight car, and sockets adjacent said legs connecting members for reception of the inner ends of said bracing arms.

9. Means for suspending an automobile in a freight car comprising a pair of bucks each arranged at one side of the automobile and each including a pair of supporting legs and a substantially horizontal member rigidly connected therebetween and means adjacent the ends of said horizontal members for supporting reception of the hubs of the front and rear wheels upon the same side of the suspended automobile, horizontal outwardly projecting bracing arms rigidly carried by the sides of the freight car, and socket carrying sleeves mounted upon the leg connecting members with the sockets thereof arranged and adapted for reception of the inner ends of said bracing arms.

In testimony whereof I affix my signature.

EDWARD S. EVANS.